Nov. 22, 1966   J. DEAN ETAL   3,286,974

CERAMIC MOLD

Filed May 9, 1962

INVENTORS.
JOHN DEAN
PHILLIP R. DUNN
BY
*Robert W. Lahtinen*
ATTORNEY

United States Patent Office 3,286,974
Patented Nov. 22, 1966

3,286,974
CERAMIC MOLD
John Dean, Kenova, W. Va., and Phillip R. Dunn, Macomb, Ill., assignors to McGraw-Edison Company, Milwaukee, Wis., a corporation of Delaware
Filed May 9, 1962, Ser. No. 193,512
6 Claims. (Cl. 249—141)

This invention relates generally to the making of ceramic objects and more particularly to molds for forming such objects and the method of making such molds.

A commonly practiced method for forming ceramic objects is the use of a plaster mold, which forms a portion of the object, in conjunction with a heated rotating die which forms the clay charge facing the open end of the mold cavity to the desired configuration. When the forming process is automated the mold is subjected to substantial pressures during charging of the mold with a plug of clay as well as during the die forming operation. In the die forming operation, which usually entails the greater pressures, it is not uncommon to achieve a force of 15 tons.

The plaster mold must possess strength adequate to withstand the forces which it will encounter and it is further desired that the plaster have a maximum porosity to facilitate migration of water through the mold cavity. Provided within the plaster mold cavity are passageways to which, during use of the mold, a vacuum may be applied to accelerate migration of moisture from the clay to the plaster mold cavity thereby effecting a partial drying of the clay while the vacuum simultaneously functions to assist in retaining the clay charge in the mold cavity. By subjecting the passageways to air under pressure the migration of water is reversed and redirected to the mold surface to be utilized initially to release the clay from the mold as a film of water is formed on the interfacial surface between the clay piece and the mold surface and thereafter to purge the excess moisture from the plaster mold cavity.

To achieve these attributes molds have previously been constructed by using a complex of reinforcing rods to which was secured a required length of air release tubing to define the passageways within the completed plaster mold. The plaster mold was then cast with the reinforcing and air passage structure embedded in the plaster surrounding the mold cavity.

A principal shortcoming of such a mold resided in the labor required to reclaim the reinforcing structure when the mold cavity was no longer usable. In the structure of the present invention a metal case surrounds the mold to provide a continuous supporting surface for the plaster mold cavity, cause the applied vacuum and air pressure to be more effective, and make the mold more resistant to damage. Further, the plaster portion may be easily stripped away from the case and discarded along with the air release tubing when it is necessary to replace the plaster mold cavity.

Another problem associated with such a mold is the release of trapped air within the cavity as the mold is charged with clay. This problem is also aggravated by higher pressure short duration operations which occur when this type mold is utilized in a high production automated process. One method of avoiding the need for venting is to preform the clay before inserting it into the mold cavity. Another solution is the provision of a vent opening, but such an opening that allows clay to be extruded through the vent or into the opening not only causes the vent to become clogged with clay but also may cause mechanical strains in the formed ceramic object giving rise to latent defects which are not detectable by any ordinary means until the object is fired.

In the mold of the present invention vent openings are provided which avoid extrusion of the clay into the vent passage by using a slotted vent limited in width according to the softness of the clay, the pressure to which the clay is subjected, and the duration of such pressure.

It is an object of this invention to provide a porous plaster mold for forming ceramic objects wherein a plaster mold cavity portion may be readily and economically replaced.

It is a further object of this invention to provide an air vent opening that resists extrusion of clay therethrough when such clay is forced into the mold cavity to cause it to conform to the surface thereof.

It is a further object of this invention to provide a mold wherein it is not necessary to preform the clay before insertion into the mold.

It is also an object of this invention to provide a ceramic clay mold wherein it is not necessary to include reinforcing rods or other supporting materials within the porous plaster mold cavity.

It is a further object of this invention to provide a mold that is porous and air permeable while having sufficient strength to withstand large compressive forces exerted during charging and forming operations.

It is a further object of this invention to provide an improved method of making porous plaster of paris ceramic molds.

Figure 1:
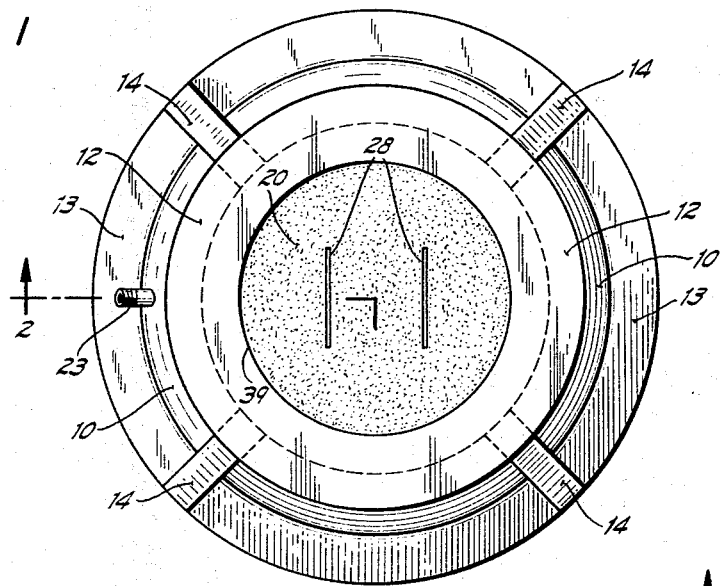
FIG. 1 is a plan view of the mold.
Figure 2:
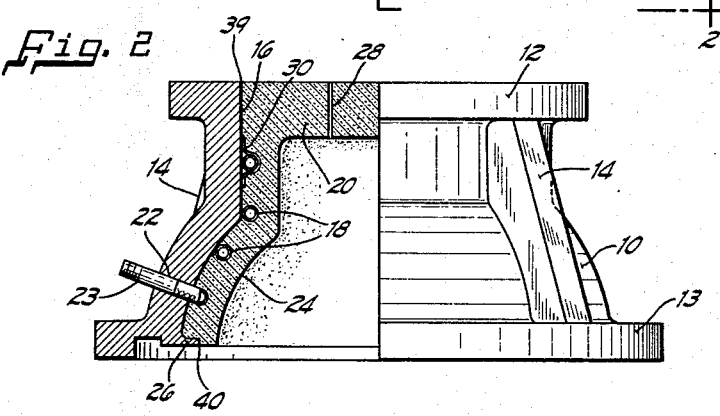
FIG. 2 is a side elevation partially in section taken on lines II—II of FIG. 1.
Figure 3:
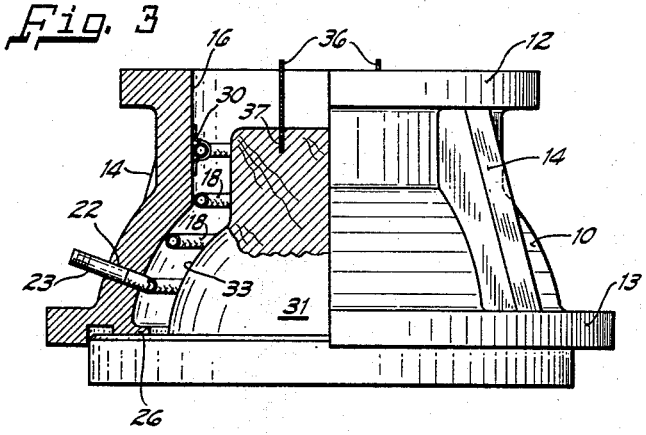
FIG. 3 is a side elevation of the mold and an associated forming hump or pattern in partial section.

Referring to the drawings and particularly to FIG. 2, an annular metal case 10 forms the radially exterior supporting shell of the mold. Rigidity of the case 10 is increased by the upper flange 12, a lower flange 13 and a series of ribs 14. Immediately adjoining the interior surface 16 of the mold case is a passageway 18 which runs helically upward along the interior surface 16 of the mold case and is commonly formed by embedding a porous fabric tubing in the plaster mold cavity 20. Other devices are also used to form passageways through the plaster such as common pipe cleaner material which is used particularly where smaller passage means or more restricted fluid communication is desired. One end of the passage 18 is in communication with the mold case opening 22 which is threaded and provided with a suitable fitting 23.

The plaster mold cavity 20 presents an axially downwardly facing mold surface 24 and is supported in a radially outward direction by contact with the mold case 10. An inwardly extending annular flange 26 on the mold case 10 prevents downward axial movement of the plaster mold cavity and dissociation of the latter from the mold case.

At the upper axial end of the mold where the plaster mold cavity 20 does not abut the mold case is of greater thickness than the radially supported side portions and has a narrow slotted vent opening 28 which provides an air passage from the most remote portion of the mold cavity where air is commonly trapped as the mold is charged with clay. Extrusion of the clay is prevented by the use of narrow slotted openings with the width of the slot varying inversely with the pressures used to charge the mold, the die pressure utilized in forming the lower portion of the object, the duration of time during which such pressures are exerted, and the softness of the clay. When this mold is used with automated forming equipment using large forces to effect quick charging and forming and with the clay consistencies generally used the slot width does not exceed two hundredths of an inch in width.

The mold is prepared by first securing the air release tubing to the interior case surface 16 with one end extending into the opening 22. This placement can be effected simply by using masking tape 30. The case is then placed over a convex form or hump 31 which has a smooth exterior surface 33 which forms the mold surface 24 of the finished cavity. The slotted vent openings 28 are formed by pieces of shim stock 36 which are received and held in place by slots 37 in the hump 31. Plaster is then poured into the space between the mold case and the hump. When the plaster has set the pieces of shim stock 36 are pulled out and air pressure is gradually applied through the connection 23 pressure drives moisture within the plaster toward the interface between the plaster cavity mold surface 24 and the hump surface 33 whereupon the mold may be readily removed from the hump 31.

Following removal of the mold from the hump the plaster cavity is allowed to dry further before being used and during this time the supply of air pressure to the passage 18 is continued which assists both in drying and in giving the plaster cavity a more porous character. On occasion some air leakage may occur at the junctions 39 and 40 between the plaster cavity and the mold case. When this occurs a small amount of shellac applied along the junctions between the case and mold cavity will effect a seal.

Various modes of carrying out the invention are contemplated as being within the scope of the following claims particularly pointing out and distinctly claiming the subject matter which is regarded as the invention.

We claim:

1. A mold for forming a surface of a ceramic object comprising: a rigid metal case presenting an annular interior surface; a porous conduit forming structure disposed adjacent said surface and communicating with an opening in said mold case; a porous plaster mold cavity presenting a concave interior mold surface and having axially extending side wall portions in radially supported contact with said interior case surface; a transversely extending axial end portion, said side wall portions being of substantially uniform thickness and said end portion being of a thickness greater than said side wall thickness; and air vent means in said axial end portion communicating with an opening in said mold surface.

2. The ceramic mold of claim 1 wherein said vent means comprises a narrow, slotted channel and said mold surface opening does not exceed two hundredths of an inch in width.

3. A mold for forming a surface of a ceramic object comprising: a porous plaster mold cavity having a concave interior mold surface; a rigid metal case portion in annular, radially supporting contact with said mold cavity, said case providing radial support to said plaster mold cavity throughout the axial length of said mold cavity; a porous conduit means associated in fluid receiving relation, with the exterior periphery of said cavity; and a narrow, slotted air release vent in said cavity communicating with said mold surface, said vent and said conduit means communicating with the exterior surface of said mold and said vent being of a sufficiently narrow width to prevent the extrusion of clay into said vent under conditions to which said mold is subjected in use.

4. A mold for forming a surface of a ceramic object comprising: a rigid metal case portion having an interior surface; porous conduit means disposed along said interior surface with a terminal end portion in fluid communication with the exterior of said mold; and a concave porous plaster mold cavity overlying said interior case surface and said passage means with axially extending radially supported wall portion of substantially constant thickness in radially supported contact with said case interior surface throughout the axial length of said mold cavity and an axial end portion of greater thickness than said wall portion.

5. A mold for forming a surface of a ceramic object comprising: a porous plaster mold cavity having a concave interior mold surface; a rigid metal case member disposed in radially supporting relation to said mold cavity; and a vent slot interconnecting said mold surface with the exterior of said mold, said slot having a width not exceeding two hundredths of an inch in communication with said mold surface.

6. A mold for forming a ceramic object comprising: a rigid metal case having an annular interior surface and first and second axial openings; a porous plaster mold cavity having side wall portions of substantially uniform thickness in overlying contact with said interior surface and an end wall of greater thickness closing said second opening to present a concave mold surface coaxial with said first opening; air passage means formed in said plaster portion and immediately adjacent said case interior surface, said passage means having one terminal portion in communication with the mold exterior through said metal case; and narrow elongated slotted air release vents extending through said mold cavity end wall and said second opening, said vents being of a width to prevent extrusion of clay into said vents under the conditions to which said mold is subjected in use.

References Cited by the Examiner

UNITED STATES PATENTS

| | | | |
|---|---|---|---|
| 1,156,085 | 10/1915 | Kirk | 25—129 |
| 1,238,347 | 8/1917 | Sebring | 25—129 |
| 1,630,762 | 5/1927 | Randall | 264—86 |
| 1,784,373 | 12/1930 | Miller | 25—129 X |
| 1,828,907 | 10/1931 | Pedersen | 264—219 |
| 1,839,110 | 12/1931 | May | 264—86 |
| 1,898,561 | 2/1933 | Miller | 264—86 |
| 1,967,740 | 7/1934 | Brill | 264—219 |
| 2,615,229 | 10/1952 | Blackburn et al. | 25—129 |
| 2,619,702 | 12/1952 | Blackburn | 25—129 |
| 2,669,762 | 2/1954 | Blackburn | 25—129 X |
| 2,733,494 | 2/1956 | Bryer et al. | 25—129 |
| 2,809,898 | 12/1957 | Theiss | 25—129 |
| 2,818,628 | 1/1958 | Stell | 25—129 |
| 2,915,801 | 12/1959 | Harry | 25—129 X |
| 2,974,384 | 3/1961 | Alcott | 18—59 X |
| 2,984,887 | 5/1961 | Theiss | 25—129 |
| 3,156,751 | 11/1964 | Valdes et al. | 25—129 |

J. SPENCER OVERHOLSER, *Primary Examiner.*

MORRIS LIEBMAN, ALEXANDER H. BRODMERKEL, WILLIAM J. STEPHENSON, *Examiners.*

R. B. MOFFITT, G. A. KAP, R. S. ANNEAR,
*Assistant Examiners.*